(12) United States Patent
Wakely et al.

(10) Patent No.: US 6,963,943 B2
(45) Date of Patent: *Nov. 8, 2005

(54) HOT SWAPPING

(75) Inventors: Timothy Wakely, Antelope, CA (US); Adam Daniel Silveria, Granite Bay, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/664,696

(22) Filed: Sep. 16, 2003

(65) Prior Publication Data

US 2004/0059857 A1    Mar. 25, 2004

Related U.S. Application Data

(63) Continuation of application No. 09/687,052, filed on Oct. 12, 2000, now Pat. No. 6,654,843.

(51) Int. Cl.$^7$ ............................................. G06F 13/00

(52) U.S. Cl. ...................... 710/302; 710/301; 710/303; 710/304

(58) Field of Search .............................. 710/301–304, 710/260–266, 100

(56) References Cited

U.S. PATENT DOCUMENTS

| | | | | | |
|---|---|---|---|---|---|
| 5,862,393 | A | * | 1/1999 | Davis | 713/300 |
| 5,935,226 | A | * | 8/1999 | Klein | 710/303 |
| 6,070,207 | A | * | 5/2000 | Bell | 710/302 |
| 6,141,711 | A | * | 10/2000 | Shah et al. | 710/302 |
| 6,282,646 | B1 | * | 8/2001 | Hendry et al. | 713/100 |
| 6,324,608 | B1 | * | 11/2001 | Papa et al. | 710/104 |
| 6,539,476 | B1 | * | 3/2003 | Marianetti et al. | 713/100 |
| 6,574,695 | B1 | * | 6/2003 | Mott et al. | 710/302 |

* cited by examiner

*Primary Examiner*—Rehana Perveen
*Assistant Examiner*—Kim T. Huynh
(74) *Attorney, Agent, or Firm*—Tuan V. Ngo

(57) ABSTRACT

Techniques are disclosed for hot-swapping devices in a computer system while maintaining the system integrity. One embodiment of the techniques uses an interface bridge between the system and a device complying with the Integrated Drive Electronic (IDE) standard. The bridge uses the IDE protocol to communicate with the device and uses the Small Computer System Interface (SCSI) protocol to communicate with the system. Consequently, with respect to the system, the bridge is treated as a SCSI device. In accordance with the techniques disclosed herein, hot swapping the device occurs on one side of the bridge, and the system on the other side of the bridge is well informed of such hot swapping in order to respond accordingly. As a result, the bus on the system side, is shielded from hot swapping disruption, thereby maintaining the system integrity.

25 Claims, 6 Drawing Sheets

HOT SWAPPING

RELATED APPLICATION

This Application is a continuation application of prior application Ser. No. 09/687,052, filed Oct. 12, 2000 Now U.S. Pat. No. 6,654,843, and claims the benefit of that prior Application.

FIELD OF THE INVENTION

The present invention relates generally to removing and adding devices to a computer system, and, more specifically, to "hot swapping," which refers to the ability to remove or add the device while the power supply of either the device or the system is in the on state.

BACKGROUND OF THE INVENTION

Because hot swapping can generate voltage spikes and data corruption that may damage both the device and the system, avoiding hot swapping is preferable. However, as a user does not have to be concerned about the state of the power supply or I/O bus while adding or removing a device, hot swapping is convenient. Further, the system, having the power supply in the on state, may maintain its tasks while the device is hot swapped.

Hot swapping has been available for devices complying with the Small Computer System Interface (SCSI) standard. However, in many approaches, the device is hot swapped directly from a SCSI bus, which affects all devices attached to the bus. Signal disruption on the bus because of hot swapping may last for many milliseconds. The SCSI specification allows different levels of hot swapping, all of which require that the bus be inactive during hot swapping. If a system supports hot swapping while the bus is active, then the system would have to keep track of all command and data transfers on the bus in order to maintain the system integrity. Unfortunately, there are potentially hundreds or thousands of these transfers during each hot swap.

With the advent of network attached storage (NAS), hot swapping storage devices is more demanding. Further, because some segments of NAS are geared towards small office environment, using SCSI in hot swapping is relatively expensive in such environment.

Based on the foregoing, it is clearly desirable that techniques be provided to solve the above deficiencies.

SUMMARY OF THE INVENTION

Techniques are disclosed for hot-swapping devices from and to a computer system while maintaining the system integrity. One embodiment of the techniques uses an interface bridge between the system and a device complying with the IDE standard. The bridge uses the IDE protocol to communicate with the device and uses the SCSI protocol to communicate with the system. Consequently, with respect to the system, the bridge is treated as a SCSI device.

While the device has been attached to the bridge, the bridge is in an "attached" state, which allows communications between the device and the system. In one embodiment, the bridge converts SCSI commands received from the system to IDE commands to be understood by the device. Further, if the bridge recognizes that the device has been removed from the system, then the bridge transitions to a "cleanup" state, then a "removed" state.

While in the cleanup state, the bridge takes appropriate actions and provides signals to a SCSI bus to indicate that the device has been removed from the system. In these conditions, the system is well informed that the device is not available, and the system can thus respond accordingly.

The removed state indicates that the device has been removed from the system. While in this removed state, the bridge transitions to a reboot state if the bridge recognizes that the device has been added to the system. From the reboot state, the bridge transitions to the attached state after initializing necessary signals for the device and the system.

In accordance with the techniques disclosed herein, hot swapping a device occurs on one side of the bridge, and the system on the other side of the bridge is well informed of such hot swapping in order to respond accordingly. Consequently, the bus on the system side is shielded from hot swapping disruption, thereby maintaining the system integrity.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

Techniques are disclosed for hot swapping devices from and to a computer system. In the following description, for the purposes of explanation, numerous specific details are set forth in order to provide a thorough understanding of the present invention. However, it will be apparent to those skilled in the art that the invention may be practiced without these specific details. In other instances, well-known structures and devices are shown in block diagram form in order to avoid unnecessarily obscuring the invention.

Figure 1:
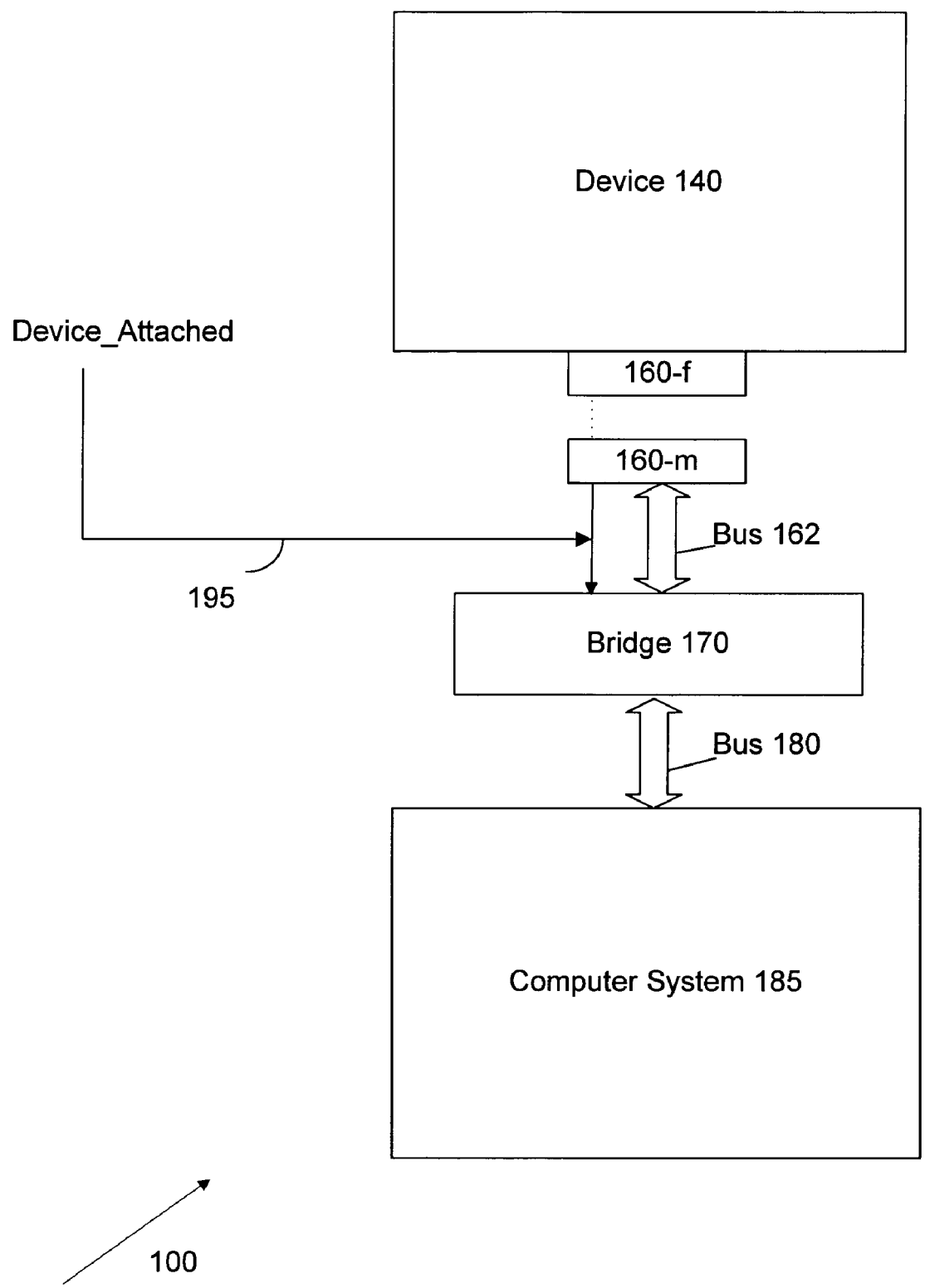
FIG. 1 shows one embodiment upon which the disclosed techniques may be implemented.

FIG. 1 shows a system 100 in which one embodiment of the disclosed techniques may be implemented. System 100 includes a device 140, a pair of connectors 160 (160-*f* and 160-*m*), a first bus 162, a bridge 170, a second bus 180, and a computer system 185. Device 140, via pair of connectors 160, can be hot-swapped from and to bridge 170. Because bridge 170 is connected to system 185, hot-swapping device 140 from and to bridge 170 equals to hot-swapping device 140 from and to system 185. Bridge 170 uses bus 162 to communicate with device 140 and uses bus 180 to communicate with system 185. Further, bridge 170 receives as inputs a signal device_attached to determine whether device 140 has been removed from or attached to bridge 170. Because hot swapping device 140 occurs on one side of bridge 170, bus 180, being on the other side of bridge 170, is shielded from signal interruption due to hot swapping device 140. As a result, the techniques disclosed herein are advantageous over other approaches in which signal disruptions are caused by removing or adding a device while the device is being connected to bus 180. In one embodiment, bus 180 is the main backbone bus that connects various devices to system 185. Consequently, signal disruption on bus 180 not only affects system 185, but also affects these various devices.

The Hot-Swapped Device

In one embodiment, device 140 complies with the IDE standard, which provides interface protocols generally for mass storage devices. The IDE standard may also be referred to as the AT Attachment (ATA) standard or specification. Examples of an IDE-compliant device 140 include disk drives, tape drives, CD-ROMs, DVD-ROMs, CD-RWs, DVD-RAMs, DVD-RWs, and other storage devices. Alternatively, device 140 may comply with any other standard for connecting a device to a computer system such as the SCSI, the Institute of Electrical and Electronics Engineers (IEEE) 1394, the Universal Serial Bus (USB), the fibre channels, etc. The SCSI standard is generally a parallel interface standard for use with disk drives, CD-ROMs, DVD-ROMs, CD-RWs, DVD-RAMSs, DVD-RWs, and other storage media. In accordance with the disclosed techniques, if device 140 is IDE-compliant, then bus 162 is IDE-compliant. Similarly, if device 140 is SCSI compliant, then bus 162 is SCSI compliant, etc. IDE disk drives are used in various embodiments because the cost of an IDE drive is about ⅓ to ½ the cost of a SCSI drive.

The Connectors

Device 140 is attached to bridge 170 via pair of connectors 160. For illustrative purposes, FIG. 1 shows that device 140 includes a female connector 160-$f$ while bridge 170 includes a male connector 160-$m$. However, the invention is not limited to the location of the male or female connectors. For example, device 140 may include a male connector 160-$m$ while bridge 170 may include a female connector 160-$f$. Further, any means for device 140 to be attached to bridge 170 is equally efficient.

Figure 2:
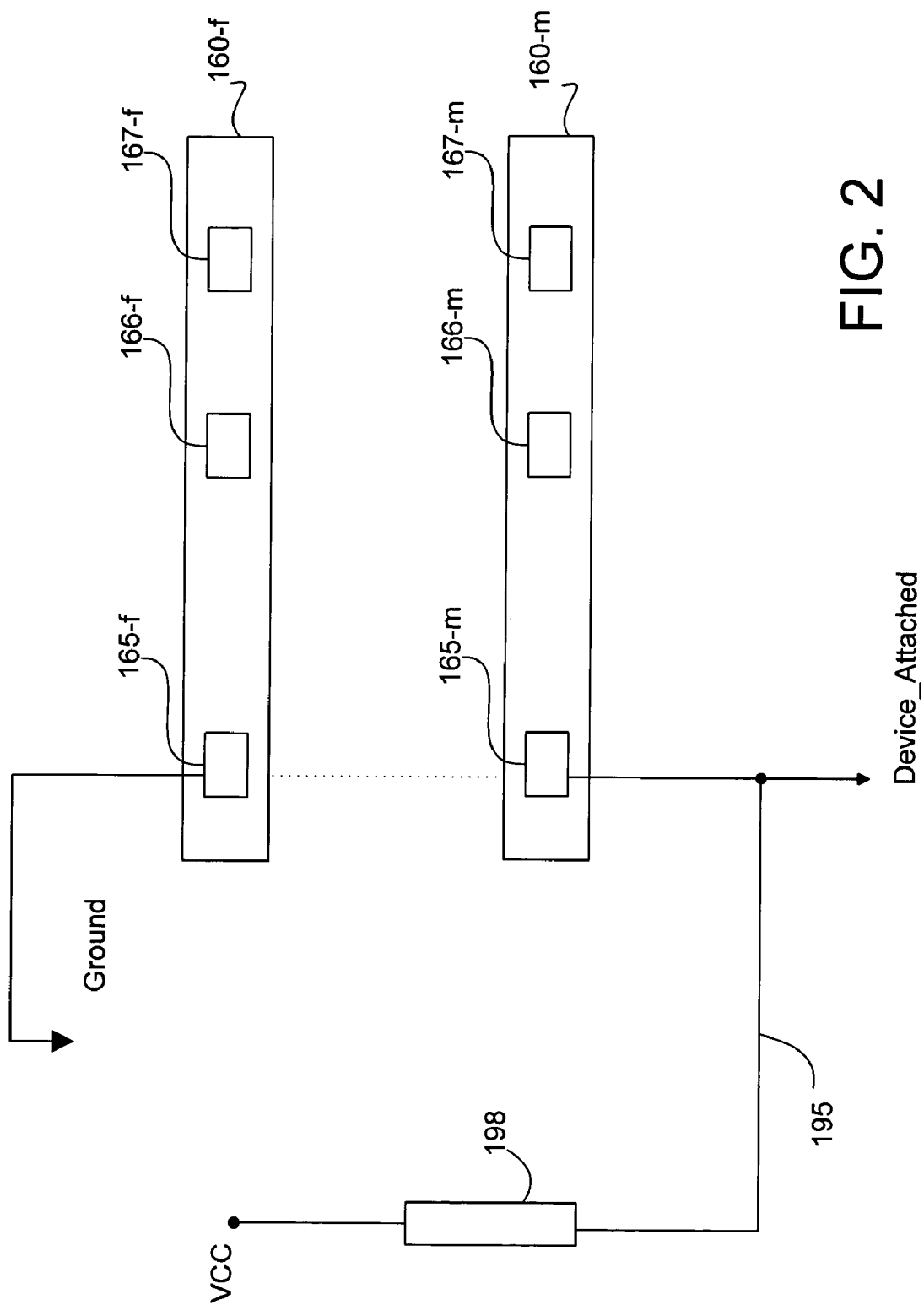
FIG. 2 shows one embodiment in which a pair of connector is used to indicate whether a device has been added to or removed from the interface bridge of FIG. 1.

FIG. 2 shows one embodiment in which a pair of connectors 160 is used to indicate whether device 140 has been attached to or removed from bridge 170. Connectors 160 include a plurality of pins having control pins 165, power pins 166, and ground pins 167. The suffixes -f and -m indicate whether a pin is on a female (-f) or a male (-m) connector. In one embodiment, control pins 165 are shorter than power and ground pins 166 and 167 so that, when connectors 160-$f$ and 160-$m$ are engaged, power and ground pins 166 and 167 are connected before control pins 165 are connected. This enables system 100 to be in a stable condition before recognizing that device 140 is attached to bridge 170. Similarly, when connectors 160-$f$ and 160-$m$ are disengaged from each other, power and ground pins 166 and 167 are disconnected after control pins 165 are disconnected. This notifies bridge 170 that device 140 is in the process of being removed and thereby allows bridge 170 to transition to the cleanup state (below) and terminate a transaction with device 140 cleanly. The FIG. 2 example shows a pair of each pin 165, 166, and 167. However, the disclosed techniques are applicable to more than one pair of each pin 165, 166, and 167.

In one embodiment, power supply VCC and a pull-up resistor 198 controls the voltage level of signal device_attached on line 195. Signal device_attached, at the low level, indicates that device 140 has been attached to bridge 170. Conversely, at the high level, signal device_attached indicates that device 140 has been removed from bridge 170. Connecting connectors 160-$f$ and 160-$m$ creates a full current path from VCC to ground on line 195, which pulls the voltage level of signal device_attached to the ground or the low level. In contrast, disconnecting connectors 160-$f$ and 160-$m$ from each other enables VCC to pull up the voltage level of signal device_attached to the VCC or the high level.

The Interface Bridge

Figure 3:
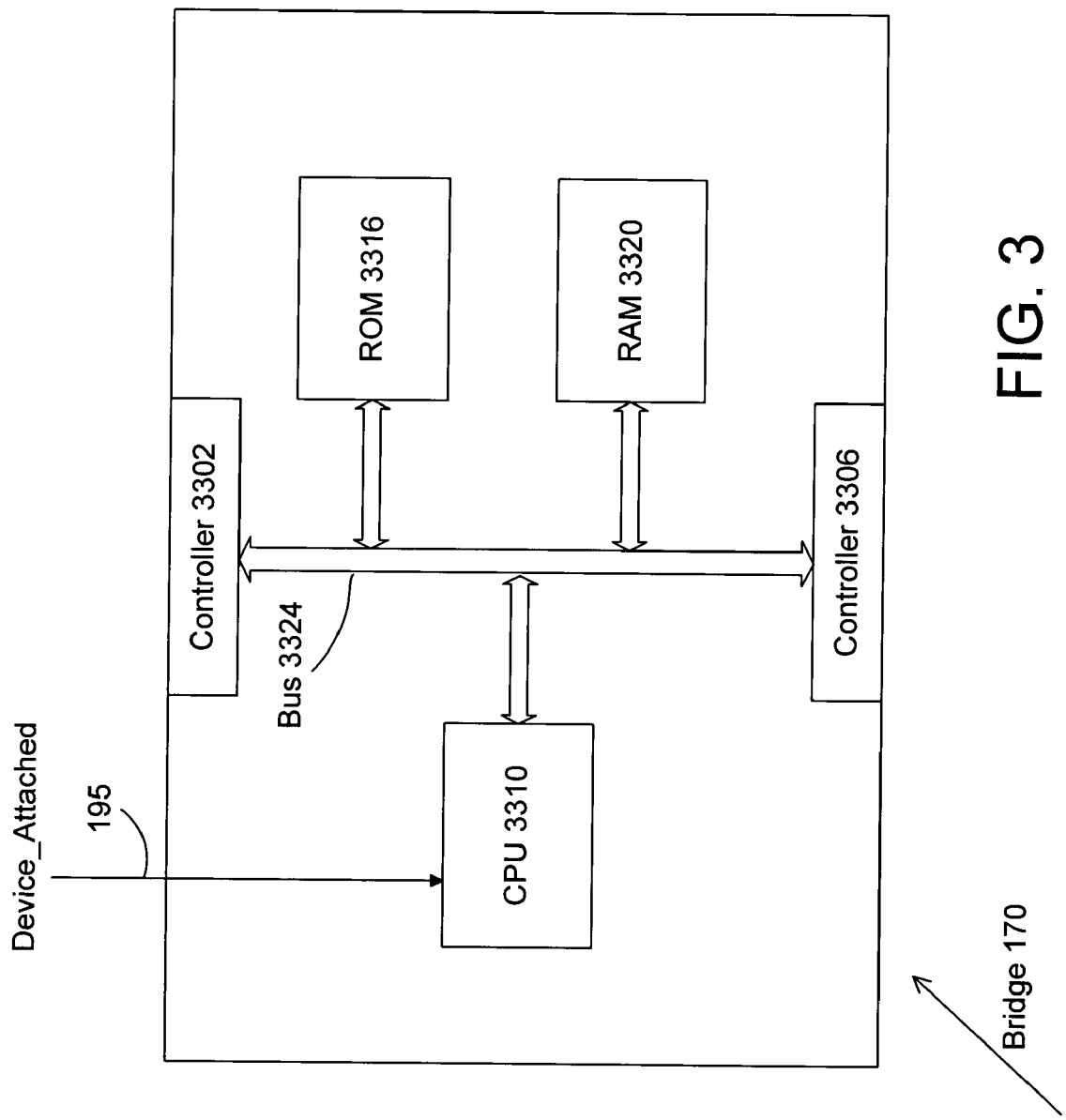
FIG. 3 shows one embodiment of the bridge in FIG. 1.

FIG. 3 shows one embodiment of interface bridge 170, including a first controller 3302, a second controller 3306, a CPU 3310, ROMs 3316, and RAMs 3320, all of which are connected to a bus 3324. First controller 3302 matches the type of device 140. For example, if device 140 is IDE-compliant, then controller 3302 is IDE-compliant, and if device 140 is SCSI-compliant, then controller 3302 is SCSI-compliant, etc. Further, in one embodiment, controller 3302 is a master controller that interfaces with a slave controller (not shown) in device 140. Similarly, controller 3306 generally matches the protocol used by system 185 to communicate with bridge 170. For example, if system 185 uses the IDE standard, then controller 3306 is IDE-compliant, and if system 185 uses the SCSI standard, then controller 3306 is SCSI-compliant, etc. Additionally, in one embodiment, controller 3306 is a slave controller that interfaces with a master controller (not shown) in system 185.

CPU 3310 executes programs stored in ROMs 3316 and RAMs 3320. These programs, commonly referred to as firmware or software, perform the function of bridge 170, including, for example, allowing communications between device 140 and system 185, translating between SCSI and IDE commands for device 140 to communicate with system 185, taking appropriate actions in response to hot swapping device 140, etc. For example, if device 140 is not attached to bridge 170, then these programs provide signals to bus 180 so that system 185 and devices connected to bus 180 can recognize that device 140 is not available. These programs also ensure that bridge 170 and device 140 are in proper conditions when device 140 is attached to or removed from bridge 170. Bus 3324 allows transferring data between controller 3302, controller 3306, CPU 3310, ROMs 3316, and RAMs 3320. Alternatively, a bus other than bus 3324 may be used to transfer data between controllers 3302 and 3306 to avoid data congestion on bus 3324. Alternative to the embodiment of FIG. 3, functions performed by bridge 170 may be implemented with a state machine having logic designs.

State Diagram for the Interface Bridge

Figure 4:
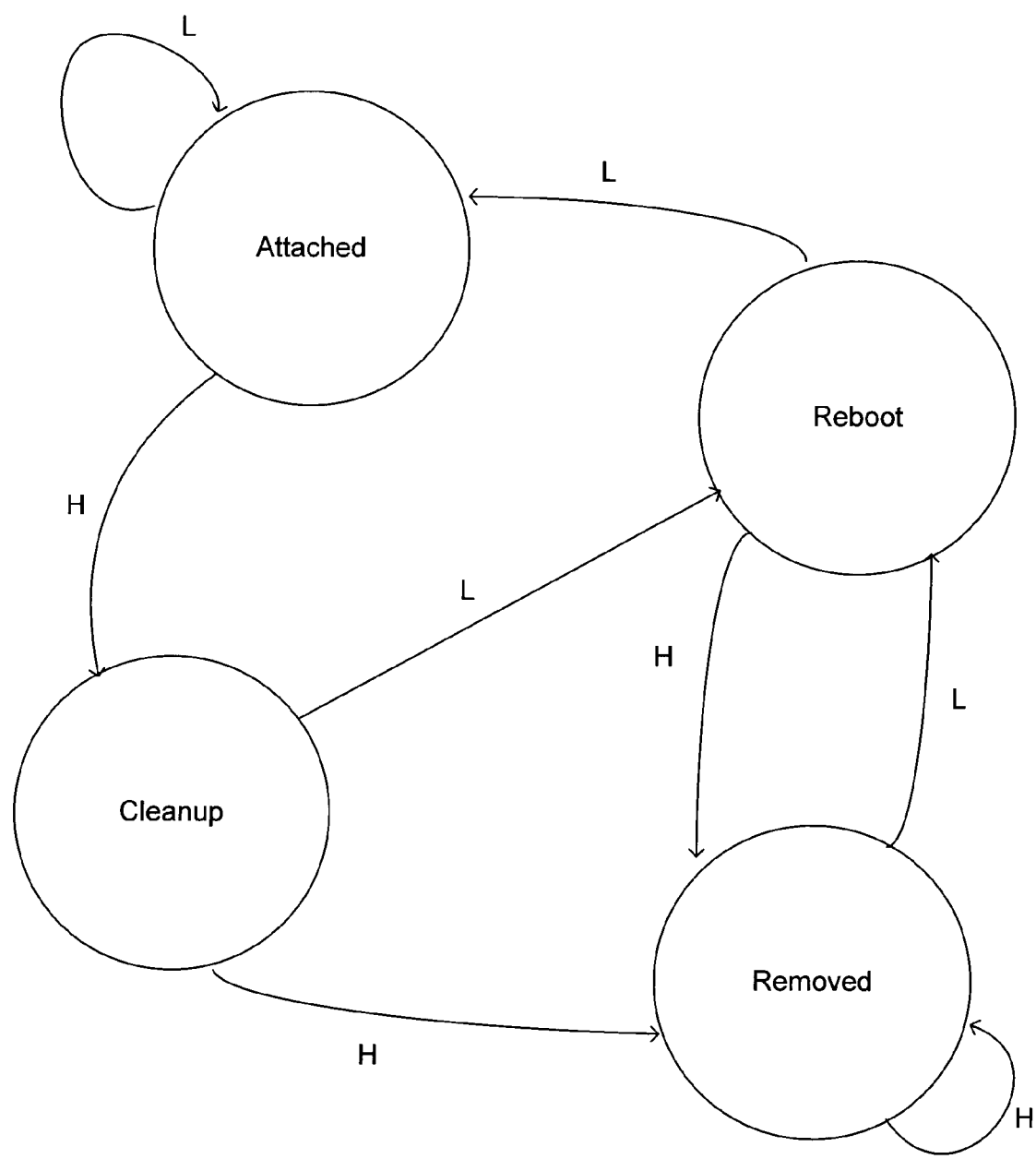
FIG. 4 shows one embodiment of the state diagram of the bridge in FIG. 1.

FIG. 4 shows a state diagram for interface bridge 170 in accordance with one embodiment. In this FIG. 4, bridge 170 includes four states "attached," "cleanup," "removed," and "reboot." The logic level of signal device_attached causes transitioning from one state to another state. An "L" indicates that signal device_attached is in the low level while an "H" indicates that signal device_attached is in the high level. Bridge 170 polls signal device_attached to decide whether to remain in the same state or to transition to a new state.

While in the attached state, which indicates that device 140 has been attached to bridge 170, signal device_attached is in the low level. As long as signal device_attached remains in the low level, bridge 170 remains in the attached state. While in this attached state, bridge 170 allows communications between device 140 and system 185. For example, bridge 170, from commands issued by system 185, fetches data in device 140 to users of system 185, allows data to be stored in device 140, etc. In one embodiment, bridge 170 acts like a SCSI device with respect to system 185 and like an IDE device with respect to device 140. In these conditions, bridge 170 converts SCSI commands from bus 180 to IDE commands to be understood by IDE devices connected to bus 162, including device 140. Consequently, device 140, in the IDE domain, executes SCSI commands issued from system 185.

As soon as signal device_attached changes to the high level, which indicates that device 140 has been removed from bridge 170, bridge 170 transitions to the cleanup state. After performing tasks defined in this cleanup state, bridge 170 transitions to the removed state if signal device_attached remains in the high level. However, while in the cleanup state, if device 140 is re-attached to bridge 170, i.e., signal device_attached reverts to the low level, then bridge 170 transitions to the reboot state after cleanup is finished.

While in the cleanup state, bridge 170 takes appropriate actions and provides signals to bus 180 to indicate that device 140 has been removed from bridge 170. In one embodiment, bridge 170 sends a "check condition" status code to system 185, which then issues a "request sense" command to brige 170. Bridge 170 in turns sends a "sense code" of "medium not present" to system 185 to inform system 185 that device 140 is not available to system 185. As a result, devices connected to bus 180, including system 185, are well informed that device 140 has been removed from bridge 170. These devices can thus respond accordingly. For example, if device 140 is removed while bridge 170 is processing a command related to device 140, then bridge 170 transitions to the cleanup state. While in this state, bridge 170 provides signals on bus 180 to inform system 185 that bridge 170 cannot process the requested command because device 140 has been removed from bridge 170. In one embodiment, bridge 170 also sends system 185 a "command terminated code" for system 185 to recognize that the command issued from system 185 has been terminated. System 185, recognizing that the command to bridge 170 has been terminated, is free to issue commands to other devices. However, if there is no process related to device 140 when device 140 is removed, then bridge 170 transitions to the removed state without performing any task. As another example, system 185 issued a request to bridge 170 for a "Microsoft Word" document stored in device 140. While bridge 170 is processing the request, e.g., converting the request to the IDE domain to be sent to device 140, device 140 is removed from bridge 170. In response, bridge 170 stops executing the request and sends a message to system 185 to indicate that the Word document cannot be accessed. Accordingly, system 185 sends a message to a user screen to indicate that the requested word document is not available.

While in the removed state, which indicates that device 140 has been removed from bridge 170, bridge 170 remains in this state as long as signal device_attached remains in the high level. Further, while in the removed state, bridge 170, and thus device 140, is considered removed from system 185. As soon as device 140 is attached to bridge 170, which is indicated by signal device_attached being low, bridge 170 transitions to the reboot state to prepare for device 140 to interface with system 185. While in the reboot state, if device 140 is removed from bridge 170, then bridge 170 reverts to the removed state.

Variations

In one embodiment, if the protocols on both sides of bridge 170 are the same, e.g., both are IDE-compliant, then bridge 170 serves as a buffer and includes only the attached state and the removed state. In such conditions, system 185 performs the functions of the cleanup and reboot state.

Figure 5:
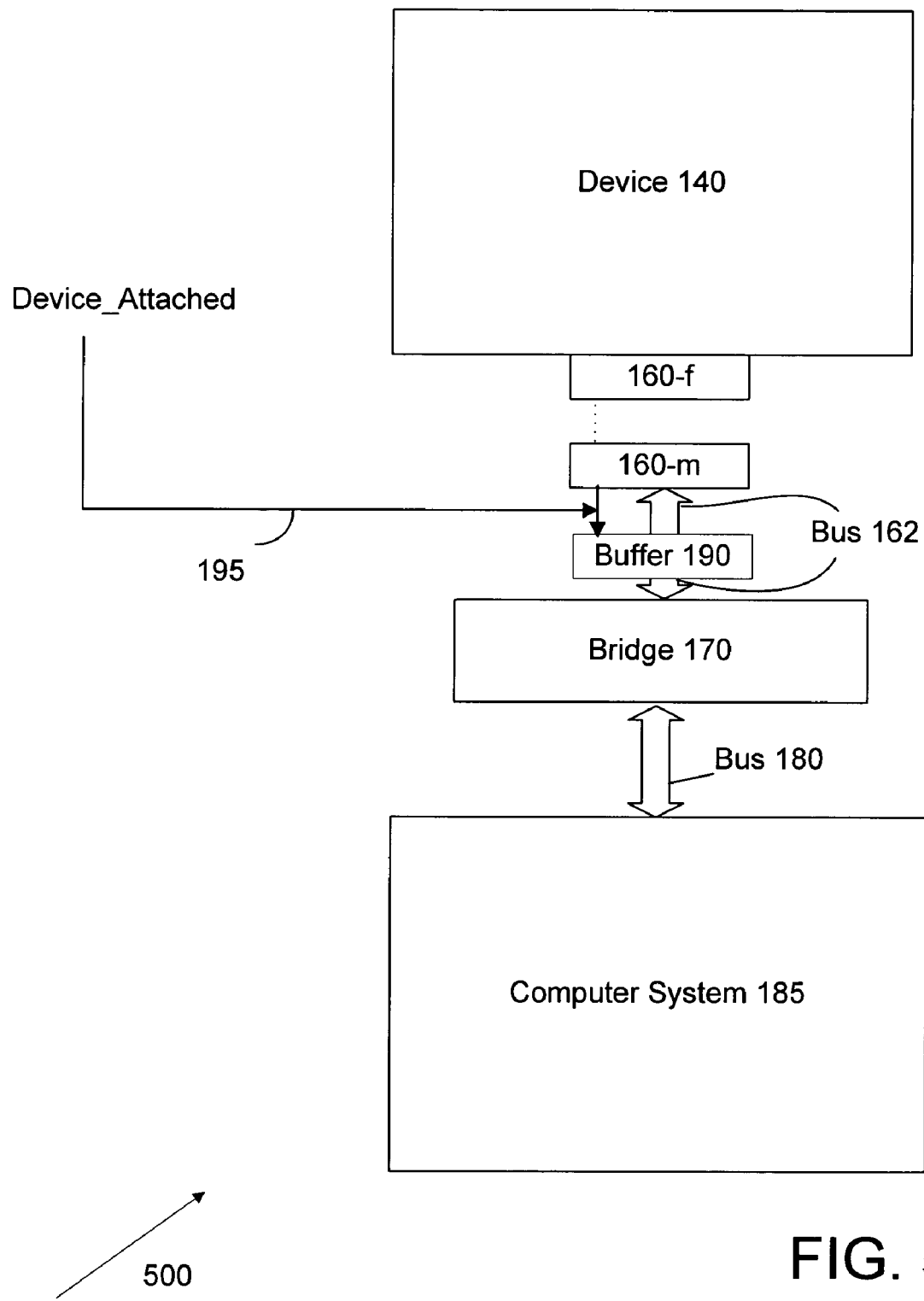
FIG. 5 shows an alternative embodiment of the system in FIG. 1 in which a tristatable buffer is used.

FIG. 5 shows an alternative embodiment 500 of system 100 in which a tristatable buffer 190 is used between connector 160-m and bridge 170 to protect bridge 170. Even though buffer 190 is shown as detached from bridge 170, buffer 190 may be part of bridge 170. Effectively, in the embodiment of FIG. 3, buffer 190 is between device 140 and controller 3302. Buffer 190 isolates the circuitry in bridge 170 from logic level changes and voltage spikes that may occur during hot swapping of device 140. Without buffer 190, controller 3302 is designed to be robust enough to survive the hot swapping of device 140. In one embodiment, if signal device_attached is low, then buffer 190 allows signals on bus 162 to pass through. Conversely, if signal device_attached is high, then buffer 190 does not allow signals on bus 162 to pass through. When bridge 170 detects that it cannot communicate with device 140, bridge 170 transitions to the cleanup state, then automatically to the removed state. In the removed state, bridge 170 polls for device 140. If the poll is successful, i.e., device 140 has been attached to bridge 170, then bridge 170 transitions to the reboot state, then the attached state.

Computer System Overview

Figure 6:
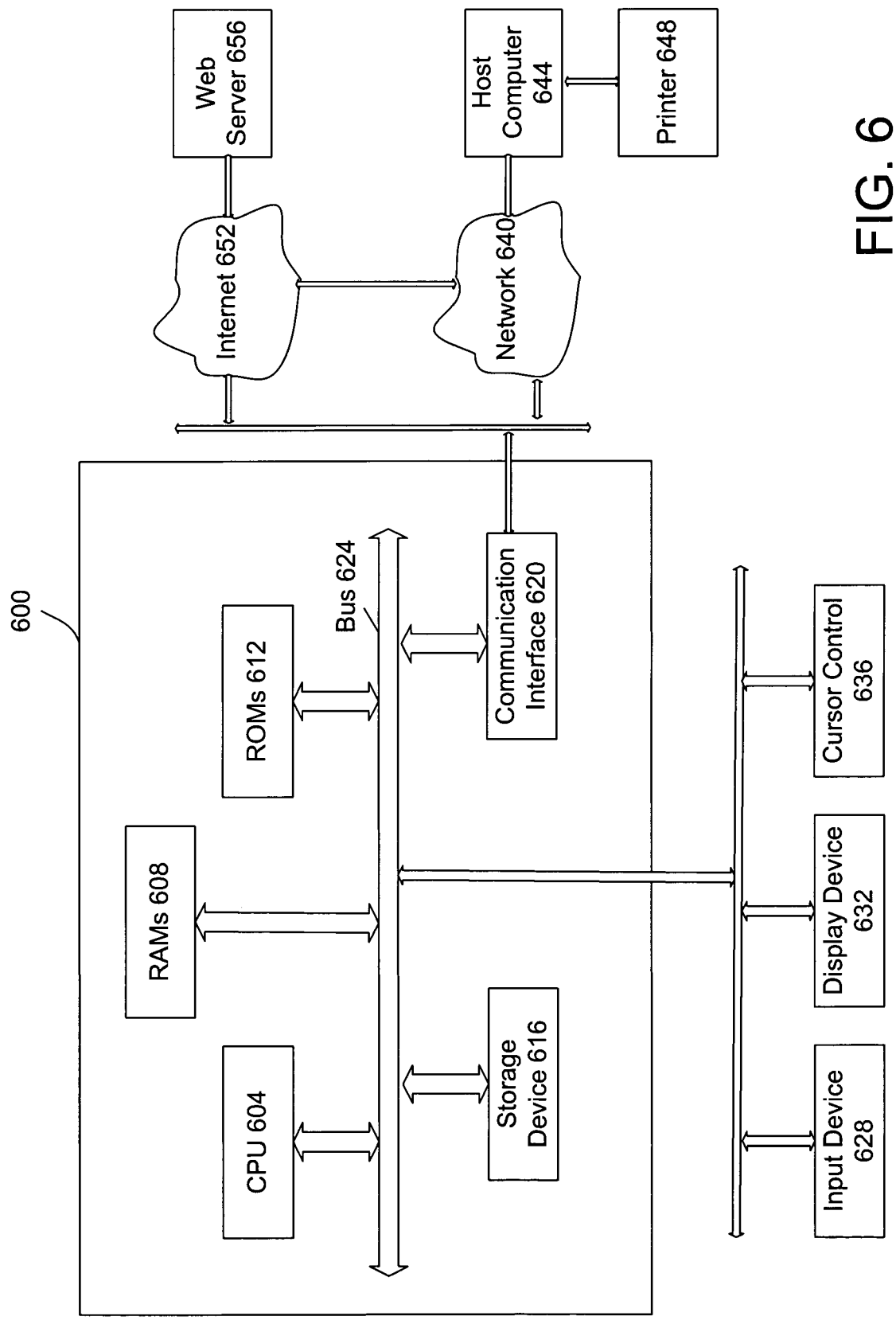
FIG. 6 shows one embodiment of a computer system upon which embodiments of the disclosed techniques may be implemented.

FIG. 6 is a block diagram showing a computer system 600 upon which an embodiment of the invention may be implemented. For example, computer system 600 may be implemented to operate as a computer system 185.

In one embodiment, computer system 600 includes a processor 604, random access memories (RAMs) 608, read-only memories (ROMs) 612, a storage device 616, and a communication interface 620, all of which are connected to a bus 624.

Processor 604 controls logic, processes information, and coordinates activities within computer system 600. In one embodiment, processor 604 executes instructions stored in RAMs 608 and ROMs 612, by, for example, coordinating the movement of data from input device 628 to display device 632.

RAMs 608, usually being referred to as main memory, temporarily store information and instructions to be executed by processor 604. Information in RAMs 608 may be obtained from input device 628 or generated by processor 604 as part of the algorithmic processes required by the instructions that are executed by processor 604.

ROMs 612 store information and instructions that, once written in a ROM chip, are read-only and are not modified or removed. In one embodiment, ROMs 612 store commands for configurations and initial operations of computer system 600.

Storage device 616, such as floppy disks, disk drives, or tape drives, durably stores information for used by computer system 600.

Communication interface 620 enables computer system 600 to interface with other computers or devices. Communication interface 620 may be, for example, a modem, an integrated services digital network (ISDN) card, a local area network (LAN) port, etc. Those skilled in the art will recognize that modems or ISDN cards provide data communications via telephone lines while a LAN port provides data communications via a LAN. Communication interface 620 may also allow wireless communications.

Bus 624 can be any communication mechanism for communicating information for use by computer system 600. In the example of FIG. 6, bus 624 is a media for transferring data between processor 604, RAMs 608, ROMs 612, storage device 616, communication interface 620, etc.

Computer system 600 is typically coupled to an input device 628, a display device 632, and a cursor control 636. Input device 628, such as a keyboard including alphanumeric and other keys, communicates information and commands to processor 604. Display device 632, such as a cathode ray tube (CRT), displays information to users of computer system 600. Cursor control 636, such as a mouse, a trackball, or cursor direction keys, communicates direction information and commands to processor 604 and controls cursor movement on display device 632.

Computer system 600 may communicate with other computers or devices through one or more networks. For example, computer system 600, using communication interface 620, may communicate through a network 640 to another computer 644 connected to a printer 648. Computer system 600 may also communicate through the world wide web 652 to a web server 656. The world wide web 652 is commonly referred to as the "Internet." Alternatively, computer system 600 may access the Internet 652 via network 640.

Computer system 600 may be used to implement the techniques described above. In various embodiments, processor 604 performs the steps of the techniques by executing instructions brought to RAMs 608. In alternative embodiments, hard-wired circuitry may be used in place of or in combination with software instructions to implement the described techniques. Consequently, embodiments of the invention are not limited to any one or a combination of software, hardware, or circuitry.

Instructions executed by processor 604 may be stored in and carried through one or more computer-readable media, which refer to any medium from which a computer reads information. Computer-readable media may be, for example, a floppy disk, a hard disk, a zip-drive cartridge, a magnetic tape, or any other magnetic medium, a CD-ROM, or any other optical medium, paper-tape, punch-cards, or any other physical medium having patterns of holes, a RAM, a ROM, an EPROM, or any other memory chip or cartridge. Computer-readable media may also be coaxial cables, copper wire, fiber optics, acoustic, or light waves, etc. As an example, the instructions to be executed by processor 604 are in the form of one or more software programs and are initially stored in a CD-ROM being interfaced with computer system 600 via bus 624. Computer system 600 loads these instructions in RAMs 608, executes some instructions, and sends some instructions via communication interface 620, a modem, and a telephone line to a network (e.g. 640, the Internet 652, etc). A remote computer, receiving data through a network cable, executes the received instructions and send the data to computer system 600 to be stored in storage device 616.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A method for allowing a device to be removably attached to a computer system while maintaining the system integrity, comprising the steps of:
    configuring a bridge between the device and the computer system; wherein
        while in an attached state
            if recognizing that the device has been removed from the bridge, then the bridge transitioning into a cleanup state, then a removed state;
        while in the cleanup state, performing the ordered steps of
            the bridge sending a first signal to the computer system;
            in response to the first signal, the computer system sending a second signal to the bridge; and
            in response to the second signal, the bridge sending a third signal to the computer system to indicate that the device has been removed from the computer system;
        removing the device from the bridge is performed without giving prior notice to the bridge, nor the computer system;
        the attached state indicating that the device has been attached to the computer system; and
        the removed state indicating that the device has been removed from the computer system.

2. The method of claim 1 wherein the bridge using a first protocol to communicate with the computer system, and using a second protocol to communicate with the device.

3. The method of claim 2 wherein the first protocol or the second protocol is:
    a protocol complying with the SCSI standard;
    a protocol complying with the IDE standard;
    a protocol complying with the fibre channel standard;
    a protocol complying with the IEEE 1394 standard; or
    a protocol complying with the USB standard.

4. The method of claim 2 wherein the bridge includes a processing unit and memory to convert commands of the first protocol and the second protocol.

5. The method of claim 2 wherein the first protocol is the same as the second protocol.

6. The method of claim 1 wherein, while in the cleanup state, if the bridge receives a processing command, then the bridge sends a fourth signal to the computer system indicating that the bridge cannot process the command.

7. The method of claim 6 wherein, while in the cleanup state, the bridge further sends a fifth signal to the computer system indicating that the command has been terminated.

8. The method of claim 7 wherein, while in the cleanup state, the computer system, upon receiving the fourth or the fifth signal from the bridge, provides a sixth signal to indicate that the command cannot be processed.

9. The method of claim 1 further comprising the step of providing a buffer between the device and the bridge for protecting the bridge from disruption signals from the device.

10. The method of claim 1 further comprising the step of providing a buffer between the device and the bridge wherein the buffer prevents the signals passing from the device to the bridge.

11. The method of claim 10 wherein the bridge transitioning to the cleanup state upon recognizing that the bridge cannot communicate with the device via the buffer.

12. The method of claim 1 wherein:
the bridge recognizes that the device has been removed from the bridge based on a signal asserted at a control pin of the bridge; and
the signal changes when the control pin of the bridge is engaged to or disengaged from a control pin of the device.

13. A system for allowing a device to be removably attached to a computer system while maintaining the system integrity, comprising:
a bridge interfacing between the device and the computer system; wherein
while in an attached state
if recognizing that the device has been removed from the bridge, then the bridge transitioning into a cleanup state, then a removed state;
while in the cleanup state
the bridge sending a first signal to the computer system;
in response to the first signal, the computer system sending a second signal to the bridge; and
in response to the second signal, the bridge sending a third signal to the computer system to indicate that the device has been removed from the computer system;
removing the device from the bridge is performed without giving prior notice to the bridge, nor the computer system;
the attached state indicating that the device has been attached to the computer system; and
the removed state indicating that the device has been removed from the computer system.

14. The system of claim 13 wherein the bridge using a first protocol to communicate with the computer system, and using a second protocol to communicate with the device.

15. The system of claim 14 wherein the first protocol or the second protocol is:
a protocol complying with the SCSI standard;
a protocol complying with the IDE standard;
a protocol complying with the fibre channel standard;
a protocol complying with the IEEE 1394 standard; or
a protocol complying with the USB standard.

16. The system of claim 13 wherein the bridge includes a processing unit and memory to convert commands of the first protocol and the second protocol.

17. The system of claim 13 wherein the first protocol is the same as the second protocol.

18. The system of claim 13 wherein, while in the cleanup state, if the bridge receives a processing command, then the bridge sends a fourth signal to the computer system indicating that the bridge cannot process the command.

19. The system of claim 18 wherein, while in the cleanup state, the bridge further sends a fifth signal to the computer system indicating that the command has been terminated.

20. The system of claim 19 wherein, while in the cleanup state, the computer system, upon receiving the fourth or the fifth signal from the bridge, provides a sixth signal to indicate that the command cannot be processed.

21. The system of claim 13 further comprising a buffer between the device and the bridge for protecting the bridge from disruption signals from the device.

22. The system of claim 13 further comprising a buffer between the device and the bridge wherein the buffer prevents the signals passing from the device to the bridge.

23. The system of claim 22 wherein the bridge transitions to the cleanup state upon recognizing that the bridge cannot communicate with the device via the buffer.

24. The system of claim 13 wherein:
the bridge recognizes that the device has been removed from the bridge based on a signal asserted at a control pin of the bridge; and
the signal changes when the control pin of the bridge is engaged to or disengaged from a control pin of the device.

25. A method for hot removing a device from a system, comprising the steps of:
configuring a bridge between the device and the system; and
configuring a buffer between the device and the bridge for protecting the bridge from signals from the device; wherein
while in an attached state
if recognizing that the device has been removed from the bridge, then the bridge transitioning into a cleanup state, then a removed state;
while in the cleanup state,
the bridge sending a first signal to the system;
in response to the first signal, the system sending a second signal to the bridge; and
in response to the second signal, the bridge sending a third signal to the system to indicate that the device has been removed from the system.

* * * * *